United States Patent [19]

Hager

[11] 4,002,352
[45] Jan. 11, 1977

[54] VEHICLE COUPLING APPARATUS

[75] Inventor: Clarence H. Hager, Rockford, Ill.

[73] Assignee: Modern Suspension Systems, Inc., Rockford, Ill.

[22] Filed: Jan. 22, 1976

[21] Appl. No.: 651,509

[52] U.S. Cl. .......................... 280/408; 280/446 B; 280/474

[51] Int. Cl.$^2$ ......................................... B60D 1/00

[58] Field of Search ........... 280/408, 446 B, 446 R, 280/474, 448, 411 R, 492, 455, 450, 459

[56] References Cited

UNITED STATES PATENTS

| | | | |
|---|---|---|---|
| 2,612,382 | 9/1952 | Landis | 280/446 B |
| 2,879,079 | 3/1959 | Edwards | 280/474 X |
| 3,400,948 | 9/1968 | Matson | 280/446 B |
| 3,414,295 | 12/1968 | Rendessy | 280/446 B |
| 3,519,287 | 7/1970 | Pontbriand | 280/446 B |
| 3,637,236 | 1/1972 | Shimoji et al. | 280/408 |
| 3,690,699 | 9/1972 | Derr | 280/446 B |

*Primary Examiner*—Philip Goodman
*Assistant Examiner*—John A. Pekar
*Attorney, Agent, or Firm*—Morsbach & Pillote

[57] ABSTRACT

An apparatus for coupling vehicles in a train of such vehicles including first and second coupler plates pivotally interconnected by a coupler pin for relative movement about an upright axis and having brake means frictionally retarding relative rotation between the coupler plates and a cam type latch means mounted on one plate and engageable in a depression in the other plate when the first and second plates are in a preselected angular position for releasably restraining relative movement between the coupler plates out of the preset angular position until the forces tending to cause relative angular movement substantially exceed the frictional force of the friction brake means. The coupler plates are releasably connected to the adjacent ends of two vehicles in a train by releasable hitch means and the hitch means mounts the coupler plates on the respective vehicles for pivotal movement relative thereto about a horizontal axis extending crosswise of the vehicle to accommodate minor changes in elevation between the coupled vehicles as they traverse the terrain.

21 Claims, 5 Drawing Figures

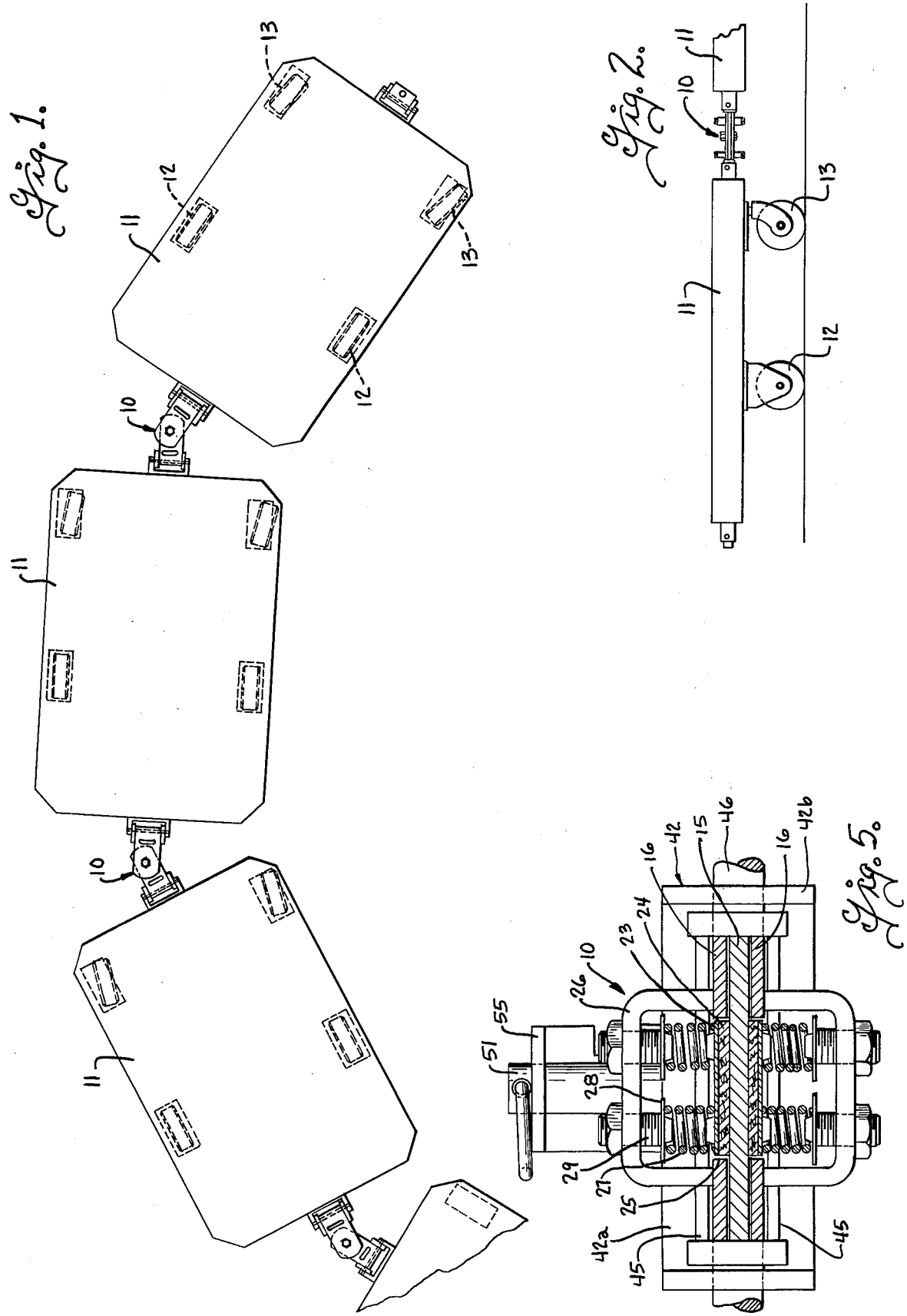

VEHICLE COUPLING APPARATUS

BACKGROUND OF THE INVENTION

It is well known that trailers, particularly of a four-wheel type, have a tendency to weave or sway, particularly at high speeds and this problem is aggravated when a number of vehicles are interconnected in a train of vehicles. It has heretofore been proposed, for example as shown in U.S. Pat. Nos. 2,612,382; 3,400,948; 3,414,295 and 3,519,287, to provide a friction type brake for frictionally retarding swaying movement between the towing and trailing vehicles. Such friction type brakes, however, apply a generally constant braking action independent of the relative angular position of the towing and trailing vehicles and it has been found that the use of such friction type brakes alone is not satisfactory to overcome the problem of swaying of vehicles in a train when the train is drawn along a straight path at moderate to high speeds.

SUMMARY OF THE INVENTION

The present invention relates to a vehicle coupling apparatus for interconnecting vehicles in a train to alleviate lateral weaving or swaying of the vehicles.

An important object of this invention is to provide a vehicle coupling apparatus that effectively inhibits lateral swaying of the trailing vehicles when drawn along a straight line, and which yet allows relatively free angular movement between the trailing vehicles when required for moving the trailing vehicles along a curved path.

A more particular object of this invention is to provide a vehicle coupling apparatus that provides a relatively high force to restrain relative angular movement between the towing and trailing vehicles when the vehicles are positioned in line to inhibit swaying of the vehicles under these conditions and which yet provides a relatively lower force restraining relative angular movement when the vehicles are out of in-line to allow relatively free turning of the vehicles.

Still another object of this invention is to provide a vehicle coupling apparatus in accordance with the foregoing object which can be readily connected and disconnected from the towing and trailing vehicles.

A further object of this invention is to provide a coupling apparatus for vehicles in accordance with the foregoing objects and which accommodates variation in level of the towing and trailing vehicles.

These and other objects of this invention are achieved by a vehicle coupling apparatus having first and second coupler plates pivotally interconnected by a coupler pin and having means for connecting the same to first and second vehicles, with a friction brake means mounted on one coupler plate to engage the other and provide a preselected frictional force resisting relative angular movement between the first and second coupler plates, and a cam type latch means mounted on one coupler plate and engageable on the latch receiving depression in the other plate when the coupler plates are in a preselected angular position for releasably restraining relative angular movement between the coupler plates out of the preselected position until the forces tending to cause relative angular movement substantially exceeds the frictional force provided by the friction brake.

The coupler plates are connected to first and second vehicles through releasable hitch means so that it is unneccessary to disassemble the friction brake and cam type latch from the coupler plates when disconnecting the vehicles. The releasable hitch means are also arranged to allow relative pivotal movement between the coupler plates and the respective vehicle about a generally horizontal axis transverse to the vehicle to accommodate variations in level of the towing and trailing vehicles.

These, together with other objects and advantages of this invention, will be more readily understood by reference to the following detailed description when taken in connection with the accompanying drawings wherein:

FIG. 1 is a plan view of a train of vehicles embodying the coupling apparatus of the present invention;

FIG. 2 is a side elevational view of a vehicle embodying the coupling apparatus;

FIG. 5 is a transverse sectional view taken on the plane 5—5 of FIG. 3.

Figure 3:
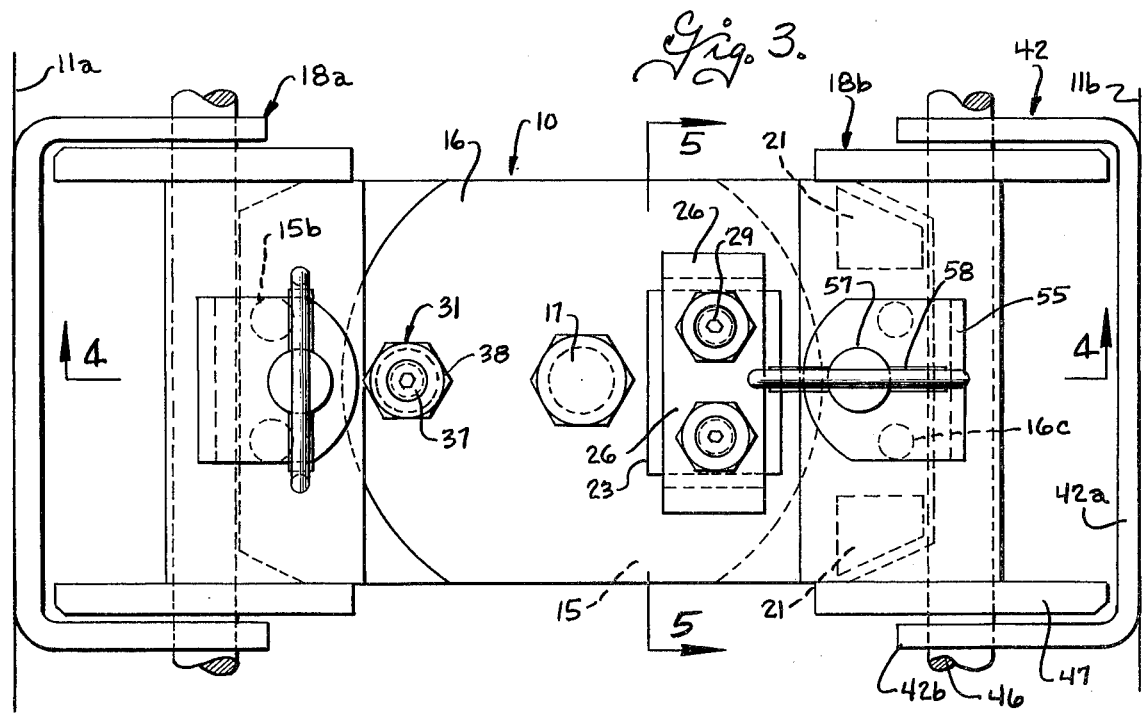
FIG. 3 is a plan view of a coupling apparatus on a larger scale than FIG. 1.

In airports, stations, warehouses and the like, it is common practice to utilize trains of cargo carts drawn by a towing vehicle for carrying cargoes. The coupling apparatus 10 of the present invention is particularly adapted for use in interconnecting vehicles 11 in a train of such vehicles to be pulled by a towing vehicle (not shown). In order to make the cart self-supporting independent of their connection to the adjacent carts or to the towing vehicle, it is customary to utilize more than two wheels, for example three, four or more wheels, with some of the wheels such as the wheels shown at 12 being fixed wheels and the other wheels such as shown at 13 being steering or caster wheels, as desired. The vehicle coupling apparatus is arranged to interconnect adjacent vehicles in the train to releasably retain the vehicles in an in-line position when the train is drawn along a straight path, and to allow relative angular movement between the vehicles as required for traversing a curved path such as shown in FIG. 1. A coupling apparatus 10 includes a first coupler plate 15 and a pair of second coupler plates 16 that overlap opposite sides of the first coupler plates and which are pivotally interconnecged thereto by a coupler pin 17 that extends through aligned openings 15a and 16a in the coupler plates. The coupler pin 17 is conveniently in the form of a bolt having a nut 17a for retaining the first and second coupler plates in assembled relation. One coupler plate 15 is connected through a first connecting means 18a to one vehicle designated 11a in FIGS. 3 and 4 and the other coupler plates 16 are connected through a second connecting means 18b to a second vehicle designated 11b in FIGS. 3 & 4. The first and second connecting means 18a and 18b are preferably of like configuration and like numerals are used to designate corresponding parts.

The coupler plates 16 are rigidly interconnected in spaced relation by spacer blocks 21 disposed between the plates 16 in a region outwardly of the coupler plate 15 and which spacer blocks are secured as by welding or the like to the plates 16. A friction brake means 22 is mounted on the coupler plates 16 to provide a preselected frictional force that resists relative angular movement between the coupler plates 15 and 16 and, advantageously, a pair of such friction brake means are provided on coupler plates 16 to engage relatively opposite sides of the coupler plate 15. Each friction brake means includes a brake pad 23 having a wear resistant lining 24 positioned in an opening 25 in the coupler plates 16 and engaging a respective side of the coupler plate 15. Generally U-shaped brackets 26 are mounted on each of the coupler plates 16 to overlie the openings 25 therein and a spring means 27 is interposed between the respective brake pad 23 and a spring retainer 28 that is adjustable by means of a screw 29 on the bracket to adjust the pressure applied to the brake pad and hence the braking pressure. The brake pads are thus yieldably biased against relatively opposite sides of the coupler plate 15 and are guidably restrained against movement relative to the coupler plate 16 in a direction paralleling plate 15 so as to frictionally retard relative angular movement between the coupler plates 15 and 16.

Figure 4:
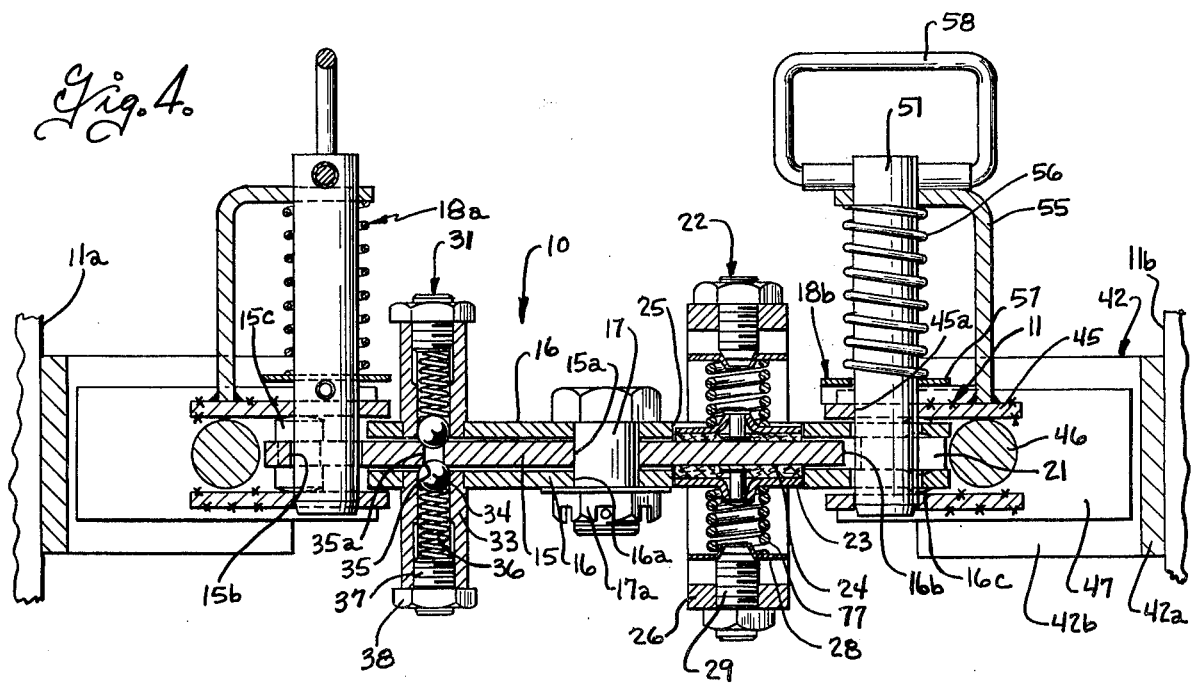
FIG. 4 is a longitudinal sectional view of the coupling apparatus taken on the plane 4—4 of FIG. 3.

A cam type latch means 31 is provided for releasably restraining relative angular movement between the coupler plates out of an in-line position. A pair of cam type latch means are preferably provided, one mounted on each of the coupler plates 16 to substantially equalize the forces applied in a direction transverse to the plate 15. Each of the cam type latch means includes a housing 33 mounted on a respective one of the coupler plates 16 and having a cam latch member 34 slidable therein in a direction transverse to the plane of the coupler plate 15 into and out of a latch receiving depression 35 in the coupler plate 15. As best shown in FIG. 4, the coupler plate 15 has a bore 35a extending therethrough and the latch receiving depressions 35 are in the form of chamfers at opposite ends of the bore 35a. The latch members 34 are yieldably biased in a direction to engage the latch receiving depressions by a spring 36 and the pressure applied by the spring is preferably adjustable as by a screw and lock nut arrangement 37, 38 mounted on the end of the latch housing 33. The latch members 34 are preferably in the form of spherical balls of a diameter sufficiently large to have substantially less than one-half of the ball extend into the latch receiving depression so that the balls will be cammed out of the depressions when the force tending to cause relative angular movement between the coupler plates exceeds a preselected value. After the balls are cammed out of the depressions, they ride on the surface of the cam plate 15 so that the resistance to relative angular movement of the coupler plates is thereafter controlled primarily by the friction brakes 22.

The connecting means 18a, 18b are arranged to releasably connect the coupler plates to the vehicles while permitting limited angular movement of the coupler plates about a generally horizontal axis transverse to the vehicles. Each connecting means includes a hitch means 41 and a hitch mounting means 42 which is adapted for connection to a vehicle. As shown, the hitch mounting means 42 comprises a generally U-shaped bracket having a web portion 42a adapted to be attached to a vehicle as by bolting, welding or the like, and leg portions 42b that project from the end of the vehicle. Each hitch means 41 includes a pair of hitch plates 45 that are rigidly secured to each other and to a pivot pin 46 by end plates 47. As best shown in FIGS. 3 and 4, the end plates 47 are secured to the hitch plates 45 as by welding and the end plates are disposed between the legs 42b of the hitch mounting means and are pivotally connected thereto by the pivot pin 46.

The hitch plates 45 are spaced apart sufficiently wide to loosely receive the pair of coupler plates 16 therebetween and a hitch pin 51 is provided for releasably connecting the coupler plates to the respective hitch means. As shown in FIG. 4, the hitch plates 45 have openings 45a therein and the coupler plates have hitch openings 15b and 16b therein adapted to register with the opening 45a to receive the hitch pin 51. The hitch pin 51 is slidably mounted on a bracket 55 attached to each hitch means 41 and the hitch pin is yieldably urged to its engaged position by a spring 56 interposed between the brackets 55 and a collar 57 on the hitch pin. A handle 58 is conveniently provided for manually releasing the hitch pin. As will be seen from FIGS. 3 and 4, the ends of the coupler plates 15 and 16 are disposed closely adjacent the respective pivot pin 46 so that relative angular movement between the coupler plates and the hitch means about the axis of the hitch pin is effectively inhibited. However, the vehicles do not always travel on an even and identical plane. The hitch pins 46 allow pivotal movement of the coupler unit relative to the vehicles about a generally horizontal axis transverse of the vehicle. The hitch plates 45 are spaced from the respective coupler plate and the hitch pin receiving openings in the coupler plates are made sufficiently large to accommodate limited relative movement between the coupler assembly and the hitch plate about an axis extending longitudinally of the vehicles. As shown in FIG. 4, spacer bosses 16c are provided on the coupler plates 16 adjacent the hitch receiving opening to engage the hitch plates and space the coupler plates 16 therefrom and, similarly, bosses 15c are provided on the coupler plate 15 to engage the hitch plates on the other hitch means to center the hitch plate therebetween.

From the foregoing it is felt that the construction and operation of the vehicle coupling apparatus will be readily understood. The coupling apparatus is arranged to interconnect vehicles in a train of vehicles for relative pivotal movement about the generally upright axis of the coupler pin 17. The friction type brake means 22 provides a preselected frictional force to resist relative angular movement between the coupler plates and hence to dampen swaying or weaving of the vehicles as they traverse a path. The latch means 31 releasably engages the latch receiving depressions in the coupler plate 15 and releasably restrains relative angular movement of the coupler plate out of an in-line position, that is a position in which the vehicles are connected in line with each other. The latch means 31 resists relative angular movement between the coupler plates out of the in-line position until the forces tending to cause relative angular movement substantially exceeds the frictional forces provided by the brake means. In this manner, the releasable latch means normally holds the coupler in an in-line position with a relatively high force and, when the force tending to cause relative angular movement becomes sufficiently high to overcome the latch means, as occurs during turning of the vehicles, the latch means will release and thereafter the forces restraining relative angular movement are relatively lower as provided by the friction brake means 22.

The embodiments of the invention in which an exclusive property or privilege is claimed are defined as follows:

1. A vehicle coupling apparatus for interconnecting vehicles in a train comprising a first coupler plate, a first connecting means for connecting the first coupler plate to one vehicle, a second coupler plate overlapping a side of the first coupler plate, a second connecting means for connecting the second coupler plate to a second vehicle, coupler pin means pivotally interconnecting said first and second coupler plates for relative movement about an axis perpendicular thereto; friction brake means including brake pad means mounted on said second coupler plate to engage said first coupler plate at a location spaced outwardly from the coupler pin means, and resilient brake actuating means yieldably biasing said brake pad means against said first coupler plate to provide a preselected frictional force resisting relative angular movement between the first and second coupler plates, one of said coupler plates having a latch receiving depression therein, cam latch means mounted on the other of said coupler plates and having resilient latch actuating means yieldably biasing said cam latch means in a direction to engage said latch receiving depression when said first and second coupler plates are in a preselected angular position for releasably restraining relative movement between said coupler plates out of said preselected angular position until the forces tending to cause relative angular movement substantially exceed the preselected frictional force provided by said friction brake means.

2. A vehicle coupling apparatus according to claim 1 wherein said first connecting means includes a first hitch mounting means connected to said first coupler plate for pivotal movement relative thereto about a first axis parallel to the plane of said first coupler plate, said second connecting means including a second hitch mounting means connected to said second coupler plate for movement relative thereto about a second axis parallel to the plane of said second coupler plate, said first and second axes extending generally parallel to each other when said first and second coupler plates are in said preselected angular position.

3. A vehicle coupling apparatus according to claim 1 wherein said first connecting means includes a first releasable hitch means for releasably connecting said first coupler plate to said one vehicle, said second connecting means includes a second releasable hitch means for releasably coupling said second coupler plate to said second vehicle.

4. A vehicle coupling apparatus according to claim 1 wherein said first connecting means includes a first hitch means and a first hitch mounting means adapted for connection to a vehicle and a first hitch pin for releasably connecting the first coupler plate to said first hitch means, said second connecting means including a second hitch means and a second hitch mounting means adapted for connecting to a vehicle and a second hitch pin releasably connecting said second coupler plate to said second hitch means.

5. A vehicle coupling apparatus according to claim 1 wherein said first connecting means includes a first hitch means and first hitch mounting means for mounting said first hitch means on a first vehicle for swinging movement relative thereto about a first horizontal axis extending crosswise of the first vehicle, said second connecting means including a second hitch means and a second hitch mounting means for mounting said second hitch means on a second vehicle for swinging movement relative thereto about a second horizontal axis extending crosswise of the second vehicle, means including a first hitch pin releasably connecting the first coupler plate to said first hitch means, means including a second hitch pin releasably connecting said second coupler plate to said second hitch means.

6. A vehicle coupling apparatus according to claim 5 wherein said first and second hitch pins extend perpendicular to the respective first and second coupler plates, and means for inhibiting turning of the first and second coupler plates about the axis of the respective hitch pin when the coupler plates are connected to the respective hitch means.

7. A vehicle coupling apparatus according to claim 1 wherein said cam latch means has a spherical ball latch member.

8. A vehicle coupling apparatus according to claim 1 wherein said means for yieldably biasing said brake pad means includes a spring and means for adjusting the pressure applied by the spring against said brake pad means.

9. A vehicle coupling apparatus according to claim 8 wherein said means for yieldably biasing said cam latch means includes a spring and means for adjusting the pressure applied by said spring to said cam latch means.

10. A vehicle coupling apparatus for interconnecting vehicles in a train comprising: a first coupler plate, a first connecting means for connecting the first coupler plate to one vehicle, a pair of second coupler plates overlapping opposite sides of the first coupler plate, a second connecting means for connecting the pair of second coupler plates to a second vehicle, coupler pin means pivotally interconnecting said first and second coupler plates about an axis perpendicular thereto, friction brake means including brake pad means mounted on each of said second coupler plates to engage said first coupler plate at opposed locations spaced outwardly from the coupler pin means, and resilient brake actuating means yieldably biasing said brake pad means against said first coupler plate to provide a preselected frictional force resisting relative angular movement between said first and second coupler plates, said first coupler plate having latch receiving depressions in opposite side faces thereof, cam latch means mounted on each of said second coupler plates and having resilient latch actuating means yieldably biasing said cam latch means in a direction to engage a respective one of said latch receiving depressions when said first and second coupler plates are in a preselected angular position for releasably restraining relative movement between said first and second coupler plates out of said preselected angular position until the forces tending to cause relative angular movement substantially exceed the preselected force provided by said friction brake means.

11. A vehicle coupling apparatus according to claim 10 wherein said cam latch means and said friction brake means are mounted on said second coupler plates at diametrically opposite sides of said coupler pin.

12. A vehicle coupling apparatus according to claim 10 wherein said first connecting means includes a first hitch mounting means connected to said first coupler plate for pivotal movement relative thereto about a first axis parallel to the plane of said first coupler plate, said second connecting means including a second hitch mounting means connected to said second coupler plates for movement relative thereto about a second axis parallel to the plane of said second coupler plates, said first and second axes extending generally parallel to each other when said first and second coupler plates are in said preselected angular position.

13. A vehicle coupling apparatus according to claim 10 wherein said first connecting means includes a first releasable hitch means for releasably connecting said first coupler plate to said one vehicle, said second connecting means includes a second releasable hitch means for releasably coupling said second coupler plates to said second vehicle.

14. A vehicle coupling apparatus according to claim 10 wherein said first connecting means includes a first hitch means and a first hitch mounting means adapted for connection to a vehicle and a first hitch pin for releasably connecting the first coupler plate to said first hitch means, said second connecting means including a second hitch means and a second hitch mounting means adapted for connection to a vehicle and a second hitch pin releasably connecting said second coupler plates to said second hitch means.

15. A vehicle coupling apparatus according to claim 10 wherein said first connecting means includes a first hitch means and first hitch mounting means for mounting said first hitch means on a first vehicle for swinging movement relative thereto about a first horizontal axis extending crosswise of the first vehicle, said second connecting means including a second hitch means and a second hitch mounting means for mounting said second hitch means on a second vehicle for swinging movement relative thereto about a second horizontal axis extending crosswise of the second vehicle, means including a first hitch pin releasably connecting the first coupler plate to said first hitch means, means including a second hitch pin releasably connecting said second coupler plates to said second hitch means.

16. A vehicle coupling apparatus according to claim 15 wherein said first and second hitch pins extend perpendicular to the respective first and second coupler plates, and means for inhibiting turning of the first and second coupler plates about the axis of the respective hitch pin when the coupler plates are connected to the respective hitch means.

17. A vehicle coupling apparatus according to claim 15 wherein said first and second hitch means each include a pair of vertically spaced hitch plates adapted to receive a portion of a respective one of said coupler plates therebetween, said hitch pins extending perpendicular to the respective coupler plate when connected thereto, said first and second hitch means each including means engageable with the respective coupler plate for limiting turning of the coupler plate relative thereto about the axis of the respective hitch pin.

18. A vehicle coupling apparatus according to claim 17 wherein said coupler plates include means engageable with the respective spaced hitch plates to vertically space the coupler plates from the hitch plates and permit limited angular movement between the coupler plates and the respective hitch plates about an axis extending lengthwise of the coupling apparatus.

19. A vehicle coupling apparatus according to claim 10 wherein said cam latch means each have a spherical ball latch member.

20. A vehicle coupling apparatus according to claim 10 wherein said means for yieldably biasing said brake pad means includes a spring and means for adjusting the pressure applied by the spring against said brake pad means.

21. A vehicle coupling apparatus according to claim 20 wherein said means for yieldably biasing said cam latch means includes a spring and means for adjusting the pressure applied by said spring to said cam latch means.

* * * * *